United States Patent [19]
Allmendinger

[11] Patent Number: 5,159,449
[45] Date of Patent: Oct. 27, 1992

[54] METHOD AND APPARATUS FOR DATA REDUCTION IN A VIDEO IMAGE DATA REDUCTION SYSTEM

[75] Inventor: Klaus K. Allmendinger, Mission Viejo, Calif.

[73] Assignee: Workstation Technologies, Inc., Irvine, Calif.

[21] Appl. No.: 814,101

[22] Filed: Dec. 26, 1991

[51] Int. Cl.⁵ .............................................. H04N 7/13
[52] U.S. Cl. ...................................... 358/136; 358/133
[58] Field of Search ................................. 358/136, 133

[56] References Cited

U.S. PATENT DOCUMENTS

| | | | |
|---|---|---|---|
| 3,580,999 | 5/1971 | Mounts | 358/136 |
| 4,414,580 | 11/1983 | Johnsen | 358/133 |
| 4,517,596 | 5/1985 | Suzuki | 358/133 |
| 4,774,574 | 9/1988 | Daly | 358/133 |

OTHER PUBLICATIONS

"Recommendation H.261-Video codec for audiovisual serices at p x 64 kbits/s," *CCITT STUDY GROUP XV-REPORT R 37*, Geneva Meeting, Jul. 16-27, 1990, pp. 79-103.

Primary Examiner—Howard W. Britton
Attorney, Agent, or Firm—Knobbe, Martens, Olson & Bear

[57] ABSTRACT

Reducing the amount of data required to describe a greyscale image is achieved by determining the modal greyscale and giving all pixels within a tolerance level of, for example, ±2 greyscale levels of the modal greyscale, a logic value of 0. This leads to significant data reduction since proportionally very many pixels are effected. The contrast extremes of the image are unaffected however so that the image remains reasonably comprehensible.

34 Claims, 3 Drawing Sheets

METHOD AND APPARATUS FOR DATA REDUCTION IN A VIDEO IMAGE DATA REDUCTION SYSTEM

BACKGROUND OF THE INVENTION

1. Field of the Invention

The present invention is in the field of video compression and more particularly data reduction in a video image data reduction system, wherein both static and dynamic video images can be stored using less data to adequately define the image.

2. Description of the Related Art

Data reduction is particularly useful in a video telephone application where there is a very demanding requirement for data reduction so that the transmission falls within the bandwidth or bit rate capacity of the telephone line. Additionally, there is a requirement in multimedia applications to be able to store static and dynamic video images efficiently. Such data may be stored on CD-ROM or transmitted over computer networks. Video image data reduction has a long history, stemming largely from the need to reduce the bandwidth required to transmit the video signal in a video telephone service, since a high bandwidth leads to high system costs. Typically, data reduction schemes have been directed to sacrificing resolution and/or motion rendition in a user acceptable way. For example, in the early 1970's, the Picturephone TM developed by Bell System required a bit rate of a few megabits per second. The essential data reduction step utilized in Picturephone was to store and process the image at the sender terminal by effecting a comparison between sequential images or frames and then transmit only that information defining picture elements that changed from frame to frame. This approach, known as "frame differencing," still forms an essential step in the most recent art in this field.

Generally then, it is known to compress video images by employing the following three step process:

Step 1. Data Acquisition

This provides for the digital video image to be represented as a two-dimensional array of pixels, with the two dimensions specifying the horizontal and vertical dimensions of the image. Each pixel comprises a data item describing the color properties of the pixel. When more bits are used, more colors or gray levels are represented by the image.

Step 2. Data reduction

The data reduction step is the heart of any video compression. The purpose of this step is to eliminate the picture information that is irrelevant to the human eye. A video signal can be described as an amplitude function where amplitude can be interpreted as brightness or color. Typical video compression methods currently employed transform this function into the frequency domain, typically using discrete cosine transforms. A threshold then eliminates frequencies that the human eye is insensitive to. These transformations are computationally intensive and therefore require specialized hardware which makes them expensive. For moving images, there is a further data reduction step comprising the comparison of successive frames of video so that only the differences are processed.

Step 3. Data compression.

This step compresses the reduced data from step 2 using well known data compression methods such as Huffman encoding or run length encoding.

OBJECT OF THE INVENTION

It is an object of the invention to provide a method for data reduction in a video image data reduction system that does not require computationally intensive procedures. It is a further object to provide an apparatus for data reduction in a video data reduction system that is less costly and complex than that hitherto available.

SUMMARY OF THE INVENTION

In accordance with the present invention, a method of data reduction in a video data reduction system comprises the steps of:

providing all elements of a first data set, each element defining a variable value of a sub-section of an image;

providing all elements of a second data set, each element defining a reference value;

comparing all elements of the first data set with corresponding elements in the second data set; and generating an amended first data set by changing each element of the first data set to a selected data value if the value of the said element of the first data set falls within a selected tolerance level of the corresponding element of the second data set, thereby to reduce the amount of data required to define the amended first data set.

The comparison and changing steps are not computationally intensive, thus overcoming the prior art deficiencies associated with frequency domain transformations.

More specifically, the variable value may be a greyscale level and the sub-section may be at least one pixel of the image such that the elements of the first data set comprise the set of greyscale levels of at least one pixel of the image. This will be the case for the most common implementation of the present invention, i.e., with greyscale images on a bit-mapped display. For the avoidance of doubt, however, the present invention is equally applicable to other representations such as color imaging.

Usually, the elements of the second data set will be the modal greyscale level of the image, i.e., the level that occurs most frequently in the image to be data reduced. This choice is made since in the image there are likely to be many pixels with greyscale levels close to or equal to the modal level so that shifting their greyscale level to that of the modal level, and then coding that level with a single short data word such as logic 0, results in a very significant reduction in the amount of data required to define the image. The cost is that detail is lost in just those ares of the image in which there was originally the most tonal subtlety, but this is considered acceptable in applications of the present invention, such as video telephones.

The selected tolerance level may also be a user selectable number of greyscales so that the user can determine the trade off between loss of tonal subtlety or resolution and data reduction to effect a sufficient approximation to real time video.

An amended second data set may also be derived from the second data set, where the amended second data set equates to the unchanged first data set, thus providing a perfect reference from which conventional frame differencing can operate. In addition, where all elements of the first data set are sequentially compared and changed in accordance with the method of the invention, then elements of the first data set defining subsections that are separated from each other by a selected interval may be compared with the amended second data set to provide thereby a high definition first data set.

In such a context, a subsection may be a scanline of an image; the selected interval may be a preselected number of scanlines, and the method of the invention then comprises the further step of arranging for a subsequent frame of the image to comprise a further high definition first data set having elements defining different scanlines of the image. Generally, the preselected number is selected to provide an amended first data set comprising the greyscale levels of the pixels of scanlines excluded from comparison and changing within a selected time. More particularly, the different scanlines may be selected out of their sequential order. This is advantageous because otherwise a static image would appear to be divided into bands of higher definition that widen with time. This banding is undesirable.

Commonly, a subsection may comprise either or both even and odd scanlines of an image or may comprise exclusively either odd or even scanlines. In the latter case, there is provided a further step of inferring omitted scanlines from adjacent scanlines. Likewise, the subsection may comprise exclusively either odd or even pixels in which case there is provided a further step of inferring omitted pixels from adjacent pixels. It may be necessary to compromise in this way to provide a workable system within the external constraints of required image size and bit rate capacity.

Preferably, the method also include the steps of:
compressing the amended first data set to form a data packet;
determining the transmission time for the data packet;
determining whether the transmission time exceeds a selected threshold; and
further reducing data, where the transmission time does exceed the threshold, by further amending the amended second data set by reducing the amount of data required to define the amended second data set.

Preferably, each element of the amended second data set defines a greyscale level of a pixel of the image and the step of further amending the amended second data set comprises the step of changing the value of alternate pixels to that of the average of adjacent pixels.

BRIEF DESCRIPTION OF THE DRAWINGS

A method for data reduction in a video image data reduction system will now be described with reference to the accompanying drawings, in which.

DETAILED DESCRIPTION OF THE PREFERRED EMBODIMENT

Figure 1:
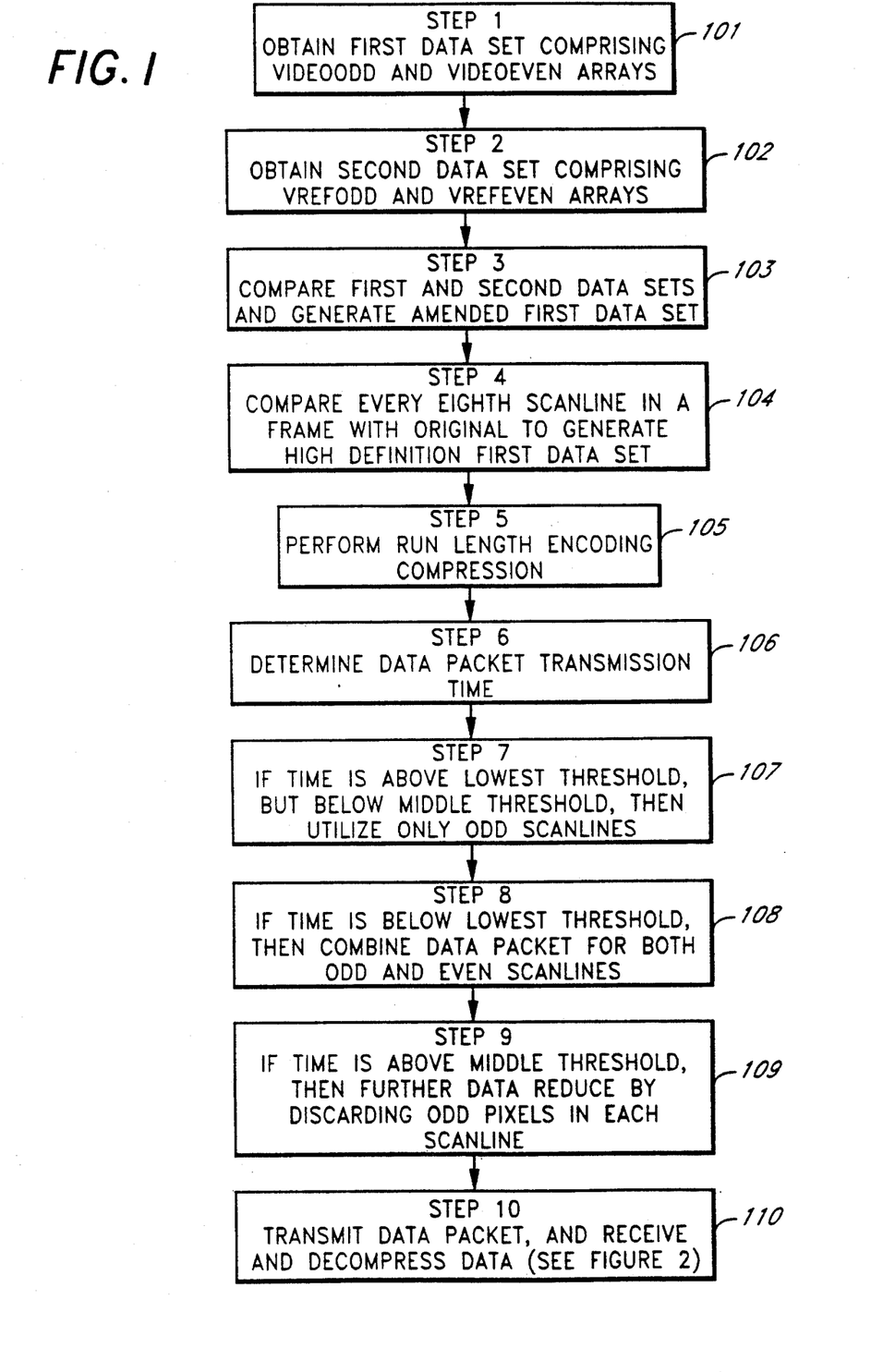
FIG. 1 is a schematic flowchart depicting the steps utilized in a method for data reduction in a video image data reduction system in accordance with the present invention.

Referring now to FIG. 1, in a Step 1 (Block 101), the video digitizer digitizes an incoming video frame into two two-dimensional arrays. The first array contains all odd numbered scanlines. This array is called VIDEOODD. The second array contains all even numbered scanlines. This array is called VIDEOEVEN. It is convenient to start by dividing the image up in this way since the eventual image may comprise only one array, i.e., the data from the other array is discarded entirely. Discarding the other array does not invariably occur, however; it is only required where transmitting both arrays becomes impossible within the limited time that any one frame should be transmitted by in order to approach real time video.

In a Step 2 (Block 102), a third and fourth array are initially filled with grey pixels. The third and fourth array are called VREFODD and VREFEVEN. The gray level for the fill is derived from the very first image and uses the grey level that is most prevalent in that first image; this is the modal level. To calculate the fill the number of pixels in the image for each of the 16 grey levels is counted and the grey level that represents the most pixels is used. A frame that is referenced to a solid grey reference frame as described is called a keyframe.

In a Step 3 (Block 103), all pixels of the VIDEOODD array are then compared to all pixels of the array VREFODD. The comparator software allows for a difference of 0, 1 or 2 gray levels for two pixels to be declared equal. All pixels in VIDEOODD that are equal (allowing for the above mentioned tolerance) to their counterpart in VREFODD are replaced with pixel value 0. The tolerance level degrades the image quality but results in more pixels being considered equal. This tolerance level is user settable. Lower tolerance results in more unequal pixels and in more data after data compression, and thus a lower frame rate. In addition, all pixels in VREFODD that are not equal to their counterpart in VIDEOODD (no tolerance allowed) are replaced with their counterpart from VIDEOODD. The result of this second replacement step is that VREFODD becomes a reference defining the original image as digitized. The point of doing this will be apparent from a Step 4, described below.

The comparator is implemented as a lookup table. Two adjacent pixels of VIDEOODD (4 bits each) and the equivalent two pixels of VREFODD are concatenated into a 16-bit index into a lookup table. The addressed entry in the lookup table contains 16 bits, 8 bits of which represent the two pixels to be put into VIDEOODD and the other 8 bits are to be put into VREFODD. This implementation method requires only 3 memory read accesses and 2 memory write accesses and no calculation or decision. The lookup table for a given tolerance is calculated only once when the user selects the tolerance level. A lookup table with a tolerance of 0 is calculated only once when the system starts up.

In Step 4 (Block 104), every eighth scanline of VIDEOODD is compared to VREFODD with a tolerance level of 0. This means it is at highest quality, i.e., as digitized. The 8-bit counter (incremented once per scanline) that rolls over every 8 scanlines is preset initially to the value of another 8-bit counter that is incremented once per frame. This second counter counts in the following sequence: 0, 4, 2, 6, 1, 5, 3, 7. This means that in the first frame scanlines 0, 8, 16, 24 . . . are in high quality. In the next frame scanlines 4, 12, 20, 28 ... are in high quality and so on. The net result is that after 8 frames are transmitted, the destination contains a high quality picture. If there is no or very little movement in the image, it results in a very high quality image. It also means that the image quality is low for moving objects but becomes high as soon as the objects sit still. Because the human eye cannot distinguish details in moving objects, this image degradation is tolerable. The count sequence for the second frame based counter is chosen to reduce the "roll down" effect noticeable if the scanlines are updated to high quality. Visually, it would look like miniblinds of 8 pixels height that close and thereby clear up the image. The count sequence chosen randomizes the update more and thus minimizes this effect.

The number 8 was chosen to completely update the image to high quality in less than a second assuming a frame rate of 10 frames/second. Larger numbers will reduce the overall amount of data transmitted per frame but require longer update times. The negative effect of larger members is partially offset by the fact that less data transmitted per frame results in a higher frame rate (for a given transmission data rate).

In a Step 5 (Block 105), the resulting VIDEOODD array is then data compressed using the conventional run length encoding procedure 'PackBits' that is part of the Macintosh operating system.

In a Step 6 (Block 106), the time to transmit the resulting data packet is then calculated. This step is necessary since data packets may not be transmittable quickly enough to satisfy the requirement that the system approach real time video. In such an event, a further data reduction is required before a data packet of sufficiently small size is arrived at. Consequently, if the data packet is very small, then it can be combined with a VIDEO-EVEN array into a single data packet. For example, in the preferred embodiment implementation, a transmission rate of 56 kBits/second or 7 kBytes/second is used. If the resulting data packet can be transmitted in less than 1/12 second (Time threshold 1), then a Step 7 (Block 107, described below) is executed, i.e., a data packet containing both even and odd data packet components is transmitted. If the resulting data packet can be transmitted in less than 1/7 second but more than 1/12 second (Time threshold 2), then this data packet, i.e., the odd data packet alone, is transmitted. If the resulting data packet cannot be transmitted in less than 1/7 second, then a Step 8 (Block 108, described below) is executed. Otherwise the resulting data packet is sent over the communication link. To have the source reference frame equal to the receivers frame, the pixels in VREFEVEN in the compressor are now replaced with averages of two adjacent scanlines in VREFODD:

Pvrefeven(x,y) = [Pvrefodd(x,y) + Pvrefodd(x,y+1)]/2
x → [0...width]    y → [0...height/2]
i.e., 0 ≤ X ≤ width    0 ≤ Y ≤ height/2

If the total number of scanlines in a frame is even, then the last line in VREFEVEN (an even line) is a direct copy of the odd line above it:

Pvrefeven(x,y)=Pvrefodd(x,y)

In Step 7 (Block 107), Steps 3, 4 and 5 are executed with the arrays VIDEOEVEN and VREFEVEN. The even and odd data packets are combined into one packet and sent over the communication link.

In Step 8 (Block 108), the horizontal resolution of VREFODD is further reduced to ½ by throwing away every other horizontal pixel according to the following formula:

P(x,y) = P(2*x,y)
x → [0... width/2]    y → [0..height/2]

The resulting array:

VIDEOODD=P[0 ... width/2,0 ... height/2]

is then data compressed using the run length encoding procedure 'PackBits' that is part of the Macintosh operating system, and the compressed data is then transmitted.

To have the source reference frame equal to the receivers frame, in a Step 9 (Block 109), the odd numbered pixels (counting from the beginning of a scanline) in VREFODD are now replaced with averages of two adjacent (even) pixels in VREFOD according to the following formula:

Pvrefodd(2*x+1,y)= [Pvrefodd(2*x,y)+Pvrefodd(2*(x+1),y)]/2
x → [0... width/2]    y → [0..height/2]

If the last pixel is an odd pixel, then it is made equivalent to the pixel preceding it:

Pvrefodd(x,y) = Pvrefodd(x−1,y)
x → [0... width/2]    y → [0..height/2]

The pixels in VREFEVEN in the compressor are now replaced with averages of two adjacent scanlines in VREFODD:

Pvrefeven(x,y)= [Pvrefodd(x,y) + Pvrefodd(x,y+1)]/2
x → [0...width]    y → [0...height/2]

If the total number of scanlines in a frame is even, then the last line in VREFEVEN (an even line) is a direct copy of the odd line above it:

Pvrefeven(x,y)=Pvrefodd(x,y).

Consequently, the data compression according to Step 6 results in reduced vertical resolution that is perceived as 'blurring' of the image. The data compression according to Step 6 followed by Step 8 results in reduced vertical and horizontal resolution perceived as more 'blurring'. Because Step 7 is executed for images with very little motion (not much difference from previous frame) and because Steps 6 and/or 8 are executed for images with more motion, the blurring is perceived as "motion blur." Because the human eye cannot register details of fast moving objects, this "motion blur" is acceptable. The compression method of the present invention thus performs in a manner analogous to a three speed automatic transmission that adapts to the current external conditions (speeds of objects).

The calculation steps needed in Step 6 and Step 8 are simple adds and shifts that execute very fast on a 32-bit microprocessor.

The total frame size in bytes (5408 bytes for a 104-pixel × 104-pixel image) is transferred to the destination in the header of a packet. The header of a packet contains additional information that identifies this packet as a video frame, specifies the data size in compressed format, and identifies whether the packet is a keyframe. If the packet is a keyframe, then the grey level used as reference (see Step 2) is also transmitted. If it is not a keyframe, the number of frames since the last keyframe is transmitted in the header. This allows for corrective measures in case a frame is lost due to transmission errors. A flag in the header determines if this sender wants the other side to transmit a keyframe (a keyframe request). Because in a videophone application the transmissions are duplex (both sides transmit and receive at the same time), this request can be packed into the sending video packet.

The time thresholds 1 and 2 are derived empirically for 104-pixel×104-pixel images in an average office environment with tolerance level set to 1. Threshold 2 is lowered to ⅓ second and threshold 1 is lowered to 1/5 second for 1 frame in the following case:

Because by compression according to Steps 6 and 8, half the pixels in the VREFODD frame are calculated as averages from neighboring pixels, it could be that the frame rate is consistently above a third threshold between threshold 1 and 2 (1/10 second) after compression with Steps 6 and 8, but Step 8 always occurs because Step 6 compares half the pixels to calculated pixels and not pixels from previous frames which results in the additional compression Step 8. The average frame rate is calculated every second and, if the frame rate is better than threshold 2 but Step 8 is consistently executed, the thresholds for one frame are lowered to allow updating of VREFODD and eventually VREFEVEN to higher resolution and to allow the comparison to real pixels.

Figure 2:
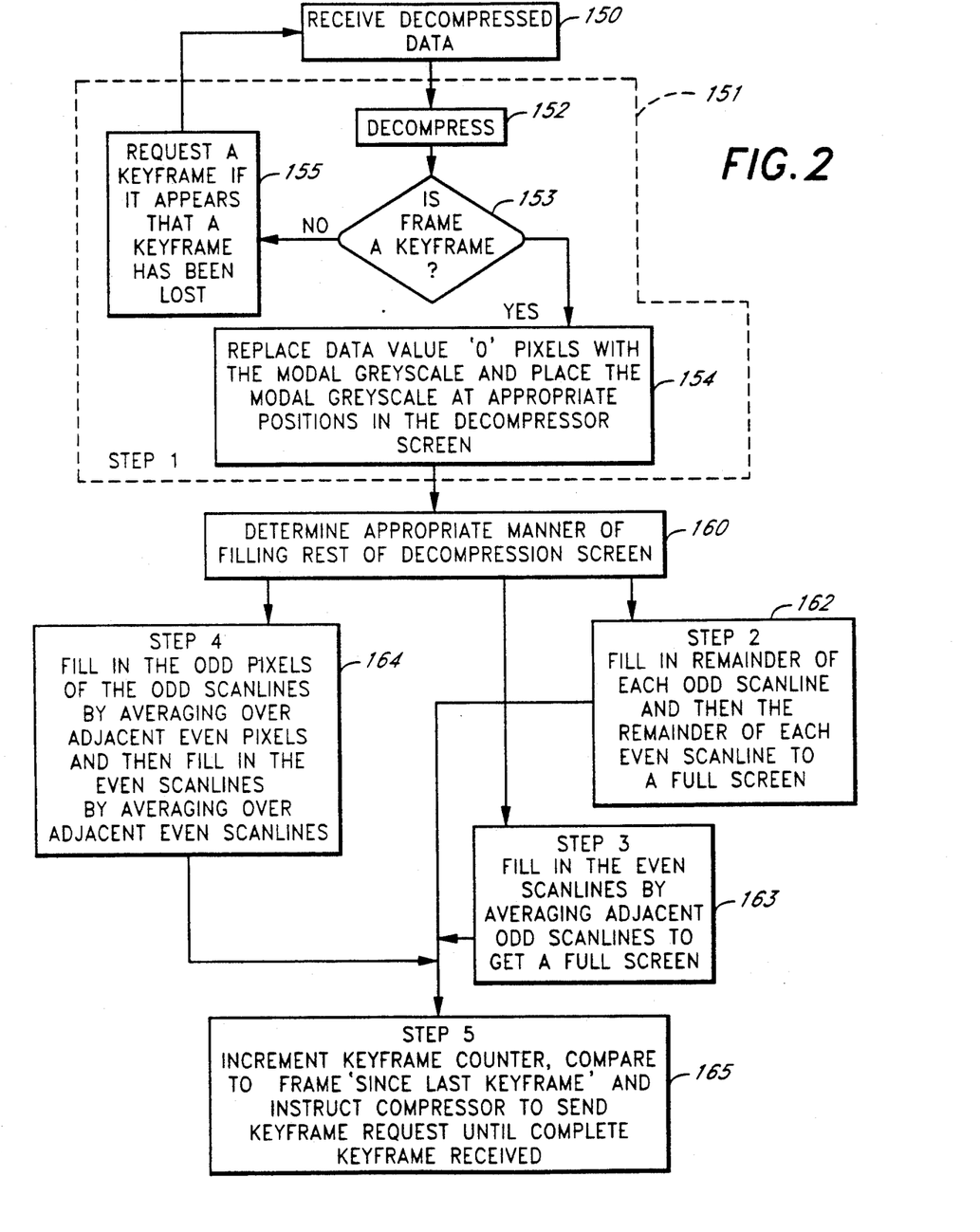
FIG. 2 is a schematic flowchart depicting the steps utilized in decompressing data which has been subject to data reduction in accordance with the present invention.

After performing the foregoing steps, the compressed data is transmitted to the other side (i.e., the receiver) in a Step 10 (Block 110) and the receiver receives and decompresses the data as described in more detail in FIG. 2.

As illustrated in FIG. 2, at the receiver, the compressed data is received (Block 150) and video decompression is achieved by the following steps. In a Step 1 (Block 151), the decompressor uses the conventional Macintosh operating procedure 'UnpackBits', the counterpart of 'PackBits', to data decompress the data packet (Block 152). If the frame was a keyframe as indicated by the keyframe flag in the packet header (Decision Block 153), then all pixels with a value of 0 are replaced by pixels with the grey level value indicated in the header and the 'frames received since keyframe' counter is set to 0 (Block 154). If the frame was not a keyframe and the 'frames received since keyframe' counter value is not equal to the number of frames since the last keyframe indicated in the header, then the compressor is instructed to include a keyframe request in the next packet it sends out (Block 155). All decompression and image displaying is stopped until a keyframe is received. This is also the initial start-up condition of the decompressor.

In Block 160, the decompressor determines the manner of decompressing based upon the compression steps used by the compressor. If Step 7 (Block 107) of the compression method was executed, the decompressed data size is now the same as the entire frame size because the data reduced odd and even scanlines are transmitted. Thus, in a Step 2, (Block 162), the decompressor now communicates all pixels whose values are not 0 from the first half of the data packet to the screen but only into the odd numbered scanlines. Next it communicates all pixels whose values are not 0 from the second half of the data packet to the screen but only into the even numbered scanlines.

If only Step 6 of the compression method was executed, in a Step 3 (Block 163) the decompressed data size is now exactly one half of an entire frame size because only the data reduced odd scanlines are transmitted. The decompressor then draws all pixels whose values are not 0 in the data packet to the screen but only into the odd numbered scanlines:

if Pdata(x,y) <> 0, then Pscreen(x,2*y) = Pdata(x,y)
x → [0...width]   y → [0...height/2]

The pixels in the even numbered scanlines on the screen are now calculated as an average of the pixel values above and below according to the following formula:

P(x,y)= [P(x,y−1) + P(x,y+1)]/2
x → [0...width]   y → [2,4,6,8,...height]

If the total number of scanlines in a frame is even, then the last line (an even line) is a direct copy of the odd line above it:

P(x,y)=P(x,y−1)

If Steps 6 and 8 of the compression method were executed, the decompressed data size is now exactly one quarter of an entire frame size because only the data reduced even pixels of the odd scanlines are transmitted. Thus, in a Step 4 (Block 164), the decompressor then communicates all pixels whose values are not 0 in the data packet to the screen into the even numbered pixels:

if Pdata(x,y) <> 0, then Pscreen(2*x,2*y) = Pdata(x,y)
x → [0...width/2]   y → [0...height/2]

The decompressor then calculates the odd numbered pixels of the odd numbered scanlines on the screen by calculating the average of the adjacent pixels:

Pscreen(2*x+1,y) = Pscreen(2*x,2*y)+Pscreen(2*(x+1),2*y)]/2
x → [0...width/2]   y → [0...height/2]

If the number of pixels in a scanline is even, then the last pixel is a copy of the pixel before it:

Pscreen(2*x+1,Y)=2*x,2*y)

The pixels in the even numbered scanlines on the screen are now calculated as an average of the pixel values above and below according to the following formula:

Pscreen(x,y)= [Pscreen(x,y−1) + Pscreen(x,y+1)]/2
x → [0...width]   y → [2,4,6,8,...height]

If the total number of scanlines in a frame is even, then the last line (an even line) is a direct copy of the odd line above it.

Error recovery can also be achieved by the present invention. In a Step 5 (Block 105), the "frames received since keyframe" counter is incremented and compared to the 'frames since last keyframe' number transmitted by the transmitter. If a data packet gets lost during transmission, then the next frame received carries a 'frames since keyframe' number that is out of sequence with the 'frames received since keyframe' counter. The decompressor then instructs the compressor to send out a keyframe request with every frame that it sends until the decompressor receives a complete keyframe. This method allows recovery from transmission errors within 2 to 3 frame times and prevents having garbled data on the receiver screen. The serial transmission/receiving portion of the system only needs to detect transmission errors (using CRC or other methods) but does not need to include retransmission of erroneous packets as is customary in data transmission protocols.

As a clarification, the decompressor 'screen' that is mentioned above is not the screen of the computer but a data area in the decompressor. The pixel values of the computer monitor in a Macintosh, when set to 256 colors have no direct relationship between grey level or color and their value. Another step in the decompressor maps the 4-bit grey level pixels of the decompressor's internal screen to the closest corresponding grey levels and the needed pixel values of the physical computer screen. This mapping method and how to implement are conventional and are amply described in the Macintosh developer literature. Thus, the details are not described herein.

Figure 3:
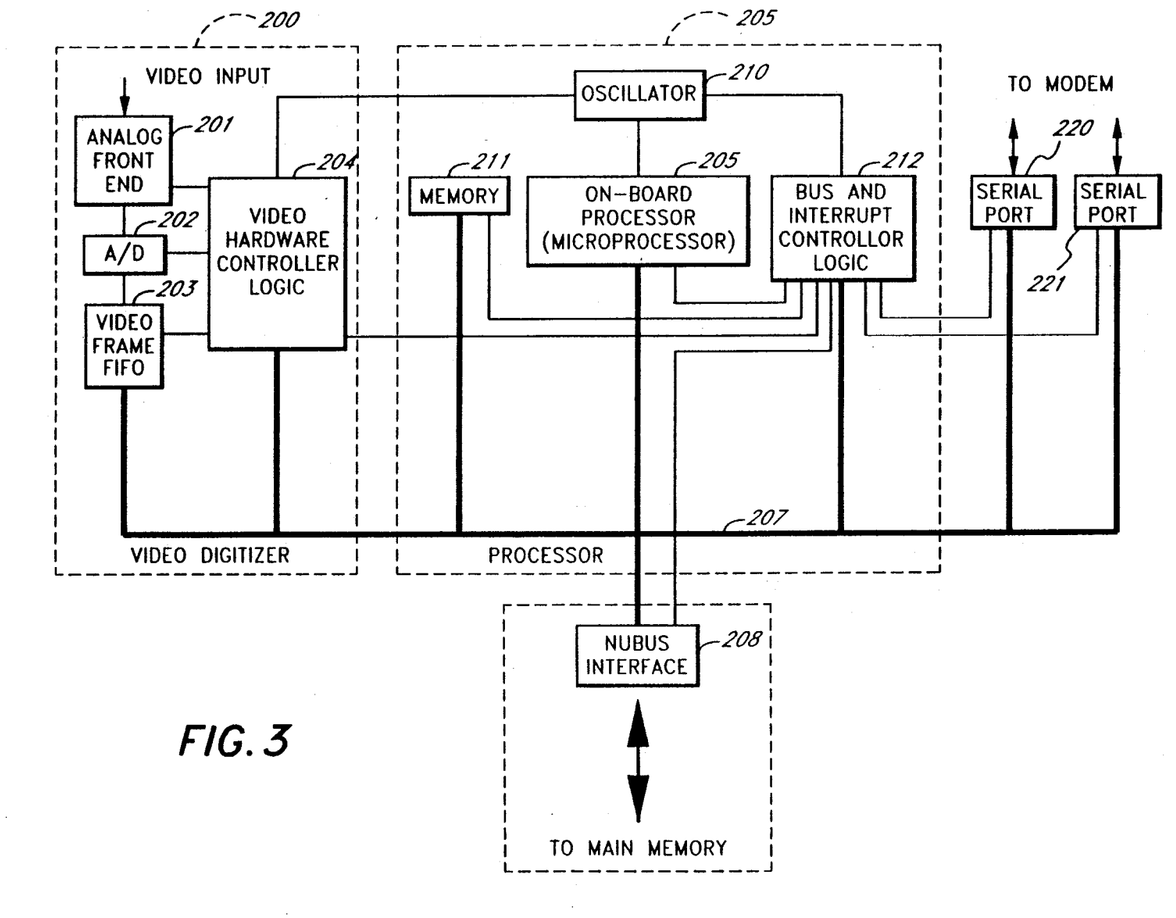
FIG. 3 is a block diagram of an apparatus for data reduction in accordance with the present invention.

The complete Videophone is implemented as a plug-in card for an Apple Macintosh II computer. Referring now to FIG. 3, the data acquisition is performed by the video digitizer portion 200 (within the broken line rectangle). The video digitizer 200 comprises an analog front end 201, a 4-bit analog-to-digital converter (A/D) 202, a video frame FIFO (first-in, first-out memory) 203, and video hardware control logic (timing and control logic) 204 which communicate with an on-board processor 205 in a processor portion 206 via an address and data bus 207.

The analog front end 201 has the tasks of:
1. Low pass filtering the video signal (2.5 MHz cut-off frequency).
2. Sync stripping and black level restoration.
3. Black level (brightness) and gain (contrast) control.

The 4-bit analog-to-digital converter 202 converts the analog video signal into a 4-bit digital signal. The conversion frequency (sampling frequency) is 6.25 MHz.

The Video Frame FIFO 203 stores the digital video data from the analog-to-digital converter 202 so that it can be read out sequentially by the on-board processor 205 via the address and data bus 207.

The Video Hardware Control Logic 204 creates all the timing signals for the video digitizer 200 and also allows the scaling of the video signal by controlling the write enable of the Video Frame FIFO 203 on a pixel by pixel basis.

The on-board processor 205 writes for each possible pixel (320×240 pixels) a bit into a memory contained in the control logic. This allows the throwing out of pixels and complete scanlines to perform the scaling in vertical and horizontal direction.

The control logic 204 interrupts the on-board processor 205 every time a video frame is digitized and available in the video frame FIFO 203. The processor 205 then reads the output of the frame FIFO 203 sequentially, scanline-by-scanline, and outputs the video data through an interface 208, which, in the preferred embodiment, is generally a NuBus TM interface design as found in the Macintosh II computer. The video data is stored in the two arrays described earlier which are located in the Macintosh main memory (not shown).

The processor portion 206, comprises the processor 205, which is preferably a MC68EC030 microprocessor running at 25 MHz, as determined by an oscillator 210; 1 MByte of memory 211; and bus and interrupt control logic 212. The processor portion 206 executes the following tasks:
1. Runs on-board operating system with memory management and Host communication.
2. Reads video data at interrupt time and controls scaling of video and contrast and brightness control.
3. Operates the serial ports.
4. Decompresses incoming compressed video and communicates it into a window on the Macintosh screen.

The bus and interrupt control logic also creates a 63 Hz interrupt that can be used as a software watchdog timer.

The bus and interrupt control logic 212 is connected to two serial interfaces (serial ports) 220, 221, each of which preferably comprises a ZILOG Z16C30 Dual Serial Communications controller and assorted line drivers.

The video phone software, described above in connection with FIGS. 1 and 2, runs partially on the Macintosh processor (not shown) and partially on the onboard processor 205 of the video phone card. The video phone application within the Macintosh provides the user interface and sends commands and data to the on-board processor 205 through the conventional Inter-processor communication driver. The video compression portion also runs on the Macintosh processor.

To establish a video phone call the application program instructs the serial driver 220 to send the commands to a high speed data modem (not shown) to dial the number. The serial driver 220 then sends back status information continuously to the application program regarding the state of the connection. The application program also instructs the serial driver 220 to pass received data to the Decompression and drawing module for decompression. The decompression and drawing module is instructed to draw received video data into the applications window. Initially the decompression and drawing module is instructed to begin drawing only after it received at least one keyframe.

When the connection is established, the video digitizer driver 204 is instructed to digitize a frame into the two arrays in the applications memory 211. The video compression module is then called and instructed to compress the video data initially as keyframes until a frame without a keyframe request is received. The compressed video frames are then passed to the serial driver 220 for sending along with a flag in the header that indicates that this side requests a keyframe. This flag will be reset until at least one keyframe is received.

While the first frame is being sent out by the serial driver 220, the next frame is digitized and compressed. This process repeats until the call is terminated.

Every compressed frame of video that is sent out starts with a 24-byte header, followed by the compressed video data. The header has the following format:

| Byte Number | Label | Comment |
| --- | --- | --- |
| 0,1 | Packet Type | Fixed at 20 (hex). This is |

-continued

| Byte Number | Label | Comment |
|---|---|---|
| | | used to indicate to the receiving serial driver that this is a video packet that is to be passed to the decompression module. |
| 2,3 | Packet Length | The total length of this packet in bytes. |
| 4,5,6,7 | Src Length | The video data size (in bytes) before the run length encoding. This length allows the decompressor to determine if the packet was compressed according to Step 6, Step 7 or Step 8. The source length is width × height/2 if compression happened according to Step 7. It is width × height/4 if compression happened according to Step 6 only. It is width × height/8 if compression happened according to Step 6 and 8. |
| 8,9,10,11 | Dst Length | The video data size after run length encoding. This data item is required by the run length decoder. |
| 12,13 | controlBits | This is a collection of boolean variables implemented as single bits as follows: |
| | Bit 0: | When set indicates that this frame is a keyframe. |
| | Bit 1: | When set instructs the other side to send a keyframe as next frame that it sends out (keyframe request). |
| | Bit 2: | Instructs the other side to stop sending video. |
| | | All other bits are currently unused. |
| 14,15,16,17 | Sequence | This contains the sequence number of the frame (frame since last keyframe sent) as a 32-bit long word. If the current frame is a keyframe, the sequence number is by default 0. In this case, the lower 4 bits of this data item contain the reference grey level of this keyframe. |
| 18 | Horizontal | This data item contains the width/4 of the video frame in pixels. It is used by the decompressor together with the Src Length data item to determine the kind of compression used. It also tells the receiving application what width it has to allocate for the receiving window on the screen. |
| 19 | Vertical | This data item contains the height/4 of the video frame in pixels. It is used by the decompressor together with the Src Length data item to determine the kind of compression used. It also tells the receiving application what height it has to allocate for the receiving window on the screen |
| 20,21,22,23 | Reserved | These bytes are currently reserved and may be used in the future. |

What is claimed is:

1. A method of data reduction in a video data reduction system comprising the steps of:

providing all elements of a first data set, each element defining a variable value of a sub-section of an image;

providing all elements of a second data set, each element defining a reference value;

comparing all elements of the first data set with corresponding elements in the second data set; and generating an amended first data set by changing each element of the first data set to a selected data value if the value of the said element falls within a selected tolerance level of the corresponding element of the second data set, thereby to reduce the amount of data required to define the amended first data set.

2. The method of data reduction as claimed in claim 1, wherein the variable value is a greyscale level and the sub-section is at least one pixel of the image such that the elements of the first data set comprise the set of greyscale levels of at least one pixel of the image.

3. The method of data reduction as claimed in claim 1, wherein each element of the second data set is the modal greyscale level of the image.

4. The method of data reduction as claimed in claim 1, wherein the selected data value is a predetermined value.

5. The method of data reduction as claimed in claim 1, wherein the selected tolerance level is a user selectable number of greyscales.

6. The method of data reduction as claimed in claim 1, further comprising the step of creating an amended second data set from the second data set, the amended second data set equating to the unchanged first data set.

7. The method of data reduction as claimed in claim 6, wherein adjacent subsections of the image are sequentially compared and changed.

8. The method of data reduction as claimed in claim 7, wherein elements of the first data set defining subsections that are separated from each other by a selected interval are compared with the amended second data set and changed in dependence thereon to provide thereby a high definition first data set.

9. The method of data reduction as claimed in claim 8, wherein:

a subsection is a scanline of an image;

the selected interval is a preselected number of scanlines; and the method comprises the further step of arranging for a subsequent frame of the image to comprise a further high definition first data set having elements defining different scanlines of the image.

10. The method of data reduction as claimed in claim 9, wherein the preselected number is selected to provide within a predetermined time an amended first data set comprising the greyscale levels of the pixels of scanlines compared with the amended second data set.

11. The method of data reduction as claimed in claim 10, further comprising the step of arranging for the different scanlines to be selected out of their sequential order.

12. The method of data reduction as claimed in claim 1, wherein the subsection is either or both even and odd scanlines of an image.

13. The method of data reduction as claimed in claim 12, wherein the subsection comprises exclusively either odd or even scanlines, and there is provided a further step of inferring omitted scanlines from adjacent scanlines.

14. The method of data reduction as claimed in claim 13, wherein the subsection comprises exclusively either odd or even pixels and there is provided a further step of inferring omitted pixels from adjacent pixels.

15. The method of data reduction as claimed in claim 6, comprising the further steps of:
compressing the amended first data set to form a data packet;
determining the transmission time for the data packet;
determining whether the transmission time exceeds a selected threshold; and
further reducing data, where the transmission time does exceed the threshold, by further amending the amended second data set by reducing the amount of data required to define the amended second data set.

16. The method of data reduction as claimed in claim 15, wherein each element of the amended second data set defines a greyscale level of a pixel of the image, and said step of further amending the amended second data set comprises the step of changing the value of alternate pixels to that of the average of adjacent pixels.

17. A method of data transmission in a video image transmission system comprising a method of data reduction as claimed in claim 1 and the further steps of:
compressing a first data set array to form a data packet, the first data set array being formed from the sequential comparison and changing of adjacent subsections;
determining the transmission time for the data packet;
transmitting the data packet to a remote terminal; and
decompressing the data packet at the remote terminal.

18. An apparatus for data reduction in a video image data reduction system, comprising:
first means for providing all elements of a first data set, each element defining a variable value of a subsection of an image;
second means for providing all elements of a second data set, each element defining a reference value;
comparing means for comparing all elements of the first data set with corresponding elements in the second data set; and
generating means for generating an amended first data set by changing each element of the first data set to a selected data value if the value of the said element falls within a selected tolerance level of the corresponding element of the second data set, thereby to reduce the amount of data required to define the amended first data set.

19. The apparatus for data reduction as claimed in claim 18, wherein the variable value is a greyscale level and the sub-section is at least one pixel of the image such that the elements of the first data set comprise the set of greyscale levels of at least one pixel of the image.

20. The apparatus for data reduction as claimed in claim 18, wherein each element of the second data set is the modal greyscale level of the image.

21. The apparatus for data reduction as claimed in claim 18, wherein the selected data value is a predetermined value.

22. The apparatus for data reduction as claimed in claim 18, wherein the selected tolerance level is a user selectable number of greyscales.

23. The apparatus for data reduction as claimed in claim 18, further comprising creating means for creating an amended second data set from the second data set, the amended second data set equating to the unchanged first data set.

24. The apparatus for reduction as claimed in claim 23, wherein adjacent subsections of the image are sequentially compared and changed.

25. The apparatus for data reduction as claimed in claim 24, wherein subsections separated by a selected interval are either (a) excluded from comparison and changing or (b) compared with the amended second data set and changed in dependence thereon.

26. The apparatus for data reduction as claimed in claim 25, wherein a subsection is a scanline of an image and the interval is a preselected number of scanlines.

27. The apparatus for data reduction as claimed in claim 26, wherein the selected number is selected to provide within a predetermined time an amended first data set comprising the greyscale levels of the pixels of scanlines either excluded from comparison and changing or compared with the amended second data set.

28. The apparatus for data reduction as claimed in claim 18, wherein the subsection is either or both even and odd scanlines of an image.

29. The apparatus for data reduction as claimed in claim 28, wherein the subsection comprises exclusively either odd or even scanlines and there is provided means for inferring omitted scanlines from adjacent scanlines.

30. The apparatus for data reduction as claimed in claim 29, wherein the subsection comprises exclusively either odd or even pixels, said apparatus further including means for inferring omitted pixels from adjacent pixels.

31. The apparatus for data reduction as claimed in claim 28, comprising:
compressing means for compressing a first data set array to form a data packet, the first data set array being formed from the sequential comparison and changing of adjacent subsections; and
determining means for determining the transmission time for the data packet.

32. The apparatus for data reduction as claimed in claim 31, comprising threshold determining means for determining whether the transmission time exceeds a selected threshold and amending means operable where the transmission time does exceed the selected threshold to amend the second data set by changing the value of alternate pixels to that of the average of adjacent pixels so that less data is required to define the amended first data set that is generated by the comparison and changing process.

33. An apparatus for data transmission in a video image transmission system comprising apparatus for data reduction as claimed in claim 18, and further comprising:
compressing means for compressing a first data set array to form a data packet, the first data set array being formed from the sequential comparison and changing of adjacent subsections;
determining means for determining the transmission time for the data packet;
transmitting means for transmitting the data packet to a remote terminal; and
decompressing means at the remote terminal for decompressing the data packet.

34. The apparatus for data transmission as claimed in claim 31, wherein the decompressing means comprises driving means for driving a display so that the said subsections of the image are represented in appropriate positions on the display.

* * * * *